US012725576B2

(12) United States Patent
Lee et al.

(10) Patent No.: US 12,725,576 B2
(45) Date of Patent: Sep. 1, 2026

(54) DISPLAY DEVICE AND METHOD OF DRIVING SAME

(71) Applicant: LG Display Co., Ltd., Seoul (KR)

(72) Inventors: Kun Young Lee, Paju-si (KR); Dong Ho Lee, Paju-si (KR); Chang Hee Youn, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/246,403

(22) Filed: Jun. 23, 2025

(65) Prior Publication Data

US 2025/0391365 A1 Dec. 25, 2025

(30) Foreign Application Priority Data

Jun. 24, 2024 (KR) ........................ 10-2024-0081844

(51) Int. Cl.
*G09G 3/3233* (2016.01)
*G09G 3/20* (2006.01)

(52) U.S. Cl.
CPC ......... *G09G 3/3233* (2013.01); *G09G 3/2074* (2013.01); *G09G 2300/0408* (2013.01); *G09G 2300/0465* (2013.01); *G09G 2300/0819* (2013.01); *G09G 2300/0852* (2013.01); *G09G 2300/0861* (2013.01); *G09G 2310/0286* (2013.01); *G09G 2310/06* (2013.01); *G09G 2310/08* (2013.01); *G09G 2320/0233* (2013.01); *G09G 2320/0247* (2013.01)

(58) Field of Classification Search
None
See application file for complete search history.

(56) References Cited

U.S. PATENT DOCUMENTS

| | | | | |
|---|---|---|---|---|
| 12,027,080 | B1 * | 7/2024 | Jeon | G09G 3/3275 |
| 2021/0066429 | A1 * | 3/2021 | Kim | H10D 30/0316 |
| 2024/0013707 | A1 * | 1/2024 | Wang | G09G 3/32 |

FOREIGN PATENT DOCUMENTS

| | | | |
|---|---|---|---|
| KR | 10-2021-0131509 | A | 11/2021 |
| KR | 10-2022-0051619 | A | 4/2022 |
| KR | 10-2023-0166583 | A | 12/2023 |
| KR | 10-2024-0039894 | A | 3/2024 |
| KR | 10-2024-0040703 | A | 3/2024 |

* cited by examiner

*Primary Examiner* — Nicholas J Lee
(74) *Attorney, Agent, or Firm* — Birch, Stewart, Kolasch & Birch, LLP

(57) ABSTRACT

A display device and a method of driving the same are discussed. The display device can include a display panel including subpixels and a driver that drives the display panel. Each subpixel includes a light-emitting diode, a driving transistor, and a first switching transistor connected between a gate node and a drain node of the driving transistor. The first switching transistor includes a first A switching transistor and a first B switching transistor that operate in response to an Nth scan signal. Each subpixel further includes a second switching transistor connected between the gate node of the driving transistor and a first initialization voltage line, and a compensation transistor having a first electrode connected to a high-level voltage line and a second electrode connected to a connection point between the first A switching transistor and the first B switching transistor.

20 Claims, 14 Drawing Sheets

DISPLAY DEVICE AND METHOD OF DRIVING SAME

CROSS-REFERENCE TO RELATED APPLICATIONS

This application claims priority to Korean Patent Application No. 10-2024-0081844, filed in the Republic of Korea on Jun. 24, 2024, the entirety of which is hereby expressly incorporated by reference as if fully set forth into the present application.

BACKGROUND

Technical Field

The present disclosure relates to a display device and a method of driving the same.

Discussion of the Related Art

As information technology develops, the market for display devices serving as connecting media between users and information is growing. Accordingly, the use of display devices such as light emitting display (LED) devices, quantum dot display (QDD) devices, and liquid crystal display (LCD) devices is increasing.

The display devices described above include a display panel having subpixels, a driver that outputs a driving signal to drive the display panel, and a power supply that generates power to be supplied to the display panel or the driver.

The display devices can display images by allowing selected subpixels to transmit light or directly emit light when driving signals, such as a scan signal and a data signal, are supplied to the subpixels formed on the display panel.

The description provided in the discussion of the related art section should not be assumed to be prior art merely because it is mentioned in or associated with that section. The discussion of the related art section can include information that describes one or more aspects of the subject technology, and the description in this section does not limit the present disclosure.

SUMMARY OF THE DISCLOSURE

Accordingly, the present disclosure is directed to a display device and a method of driving the same that substantially obviate one or more limitations due to limitations and disadvantages of the related art.

A benefit of the present disclosure is to reduce or minimize (reduce or prevent) voltage variation in a driving transistor by eliminating a current leakage path that can be caused by a switching transistor located around the driving transistor.

In addition, a benefit of the present disclosure is to stabilize the current flowing through a light-emitting diode to reduce or minimize luminance variation and flicker, thereby improving display quality during operation at low frequencies.

Additional advantages, benefits, and features of the present disclosure will be set forth in part in the description which follows and in part will become apparent to those having ordinary skill in the art upon examination of the following or can be learned from practice of the present disclosure. The benefits and other advantages of the present disclosure can be realized and attained by the structure particularly pointed out in the present disclosure and claims hereof as well as the appended drawings.

To achieve these benefits and other advantages and in accordance with the purpose of the present disclosure, as embodied and broadly described herein, a display device includes a display panel including subpixels for displaying an image and a driver configured to drive the display panel, wherein each of the subpixels includes a light-emitting diode configured to emit light, a driving transistor configured to generate a driving current to be supplied to the light-emitting diode, a first switching transistor connected between a gate node and a drain node of the driving transistor and including a first A switching transistor and a first B switching transistor configured to operate in response to an Nth scan signal applied through an Nth scan line, a second switching transistor connected between the gate node of the driving transistor and a first initialization voltage line and configured to operate in response to an (N−1)th scan signal applied through an (N−1)th scan line, and a compensation transistor having a first electrode connected to a high-level voltage line and a second electrode connected to a connection point between the first A switching transistor and the first B switching transistor and operating in response to an Nth control signal applied through an Nth control line.

According to aspects of the present disclosure, the compensation transistor can be turned on during an emission period in which the light-emitting diode emits light.

According to aspects of the present disclosure, the compensation transistor can be turned on during the emission period in which the light-emitting diode emits light such that a high-level voltage is applied to the connection point between the first A switching transistor and the first B switching transistor.

According to aspects of the present disclosure, the subpixel can include a first control transistor positioned between a source node of the driving transistor and the high-level voltage line, and a second control transistor positioned between the drain node of the driving transistor and an anode of the light-emitting diode, and the compensation transistor, the first control transistor, and the second control transistor can be turned on simultaneously.

According to aspects of the present disclosure, the transistors included in the subpixel can be p-type low-temperature polycrystalline silicon (LTPS) transistors.

According to aspects of the present disclosure, the first A switching transistor can have a gate electrode connected to the Nth scan line, a first electrode connected to the gate node of the driving transistor, and a second electrode connected to a first electrode of the first B switching transistor, and the first B switching transistor can have a gate electrode connected to the Nth scan line, a first electrode connected to the second electrode of the first A switching transistor, and a second electrode connected to the drain node of the driving transistor.

According to aspects of the present disclosure, the subpixel can include a capacitor having a first electrode connected to the high-level voltage line and a second electrode connected to the gate node of the driving transistor, a second switching transistor having a gate electrode connected to the (N−1)th scan line, a first electrode connected to the first initialization voltage line, and a second electrode connected to the gate node of the driving transistor and the first electrode of the first A switching transistor, a third switching transistor having a gate electrode connected to the Nth control line, a first electrode connected to the high-level voltage line, and a second electrode connected to the source node of the driving transistor, a fourth switching transistor having a gate electrode connected to the Nth control line, a first electrode connected to the drain node of the driving transistor, and a second electrode connected to the anode of the light-emitting diode, a fifth switching transistor having a gate electrode connected to the Nth scan line, a first electrode connected to a first data line, and a second electrode connected to the second electrode of the third switching transistor and the source node of the driving transistor, a sixth switching transistor having a gate electrode connected to the Nth scan line, a first electrode connected to a second initialization voltage line, and a second electrode connected to the second electrode of the fourth switching transistor and the anode of the light-emitting diode, the driving transistor having a gate electrode connected to the second electrode of the capacitor, a first electrode connected to the second electrode of the fifth switching transistor and the second electrode of the third switching transistor, and a second electrode connected to a second electrode of the first B switching transistor and the first electrode of the fourth switching transistor, the compensation transistor having a gate electrode connected to the Nth control line, a first electrode connected to the high-level voltage line, and a second electrode connected to the connection point between the second electrode of the first A switching transistor and the first electrode of the first B switching transistor A, and the light-emitting diode having the anode connected to the second electrode of the fourth switching transistor and the second electrode of the sixth switching transistor, and a cathode connected to a low-level voltage line.

In another aspect of the present disclosure, a method of driving a display device includes an initialization step of initializing a gate node of a driving transistor based on a first initialization voltage, a sensing and data write step of initializing an anode of a light-emitting diode based on a second initialization voltage, sampling a threshold voltage of the driving transistor, and storing a data voltage applied through a first data line in a capacitor, and an emission step of causing the light-emitting diode to emit light based on a driving current generated from the driving transistor and blocking a leakage path between the gate node and a drain node of the driving transistor, wherein the emission step includes applying a high-level voltage to a connection point between a first A switching transistor and a first B switching transistor connected between the gate node and the drain node of the driving transistor to block the leakage path.

According to aspects of the present disclosure, the applying the high-level voltage can include turning on a compensation transistor having a first electrode connected to a high-level voltage line and a second electrode connected to the connection point between the first A switching transistor and the first B switching transistor and operating in response to an nth control signal applied through an Nth control line.

According to aspects of the present disclosure, the compensation transistor can be turned on during an emission period in which the light-emitting diode emits light.

Other systems, methods, features and advantages will be, or will become, apparent to one with skill in the art upon examination of the following figures and detailed description. It is intended that all such additional systems, methods, features and advantages be included within this description, can be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description of the present disclosure are examples and explanatory and are intended to provide further explanation of the present disclosure as claimed.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

Figure 1:
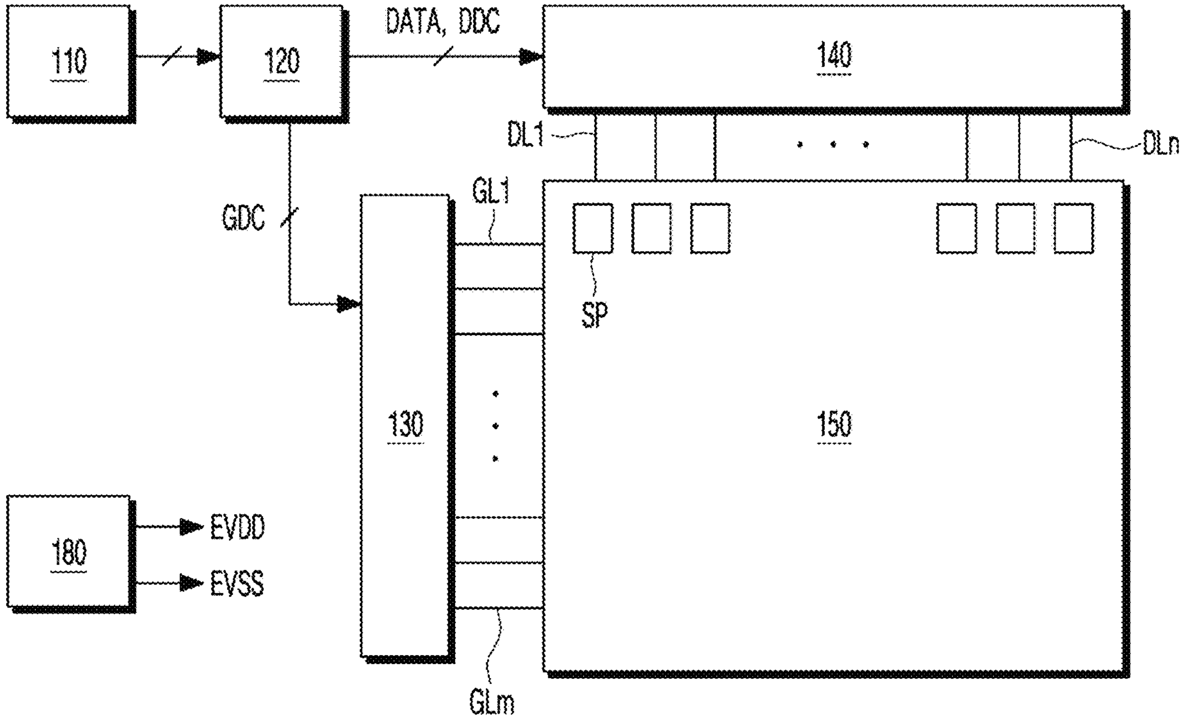
FIG. 1 is a block diagram schematically showing a light-emitting display device according to aspects of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience.

DETAILED DESCRIPTION OF THE EMBODIMENTS

Reference will now be made in detail to embodiments of the present disclosure, examples of which can be illustrated in the accompanying drawings. All the components of each display device according to all embodiments of the present disclosure are operatively coupled and configured. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and can be changed as is known in the art, with the exception of steps and/or operations necessarily occurring in a particular order.

Like reference numerals designate like elements throughout. Names of the respective elements used in the following explanations can be selected only for convenience of writing the specification and can be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments can be provided so that this disclosure can be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure can be merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration can be omitted. When "comprise," "have," and "include" described in the present specification are used, another part can be added unless "only" is used. An element described in a singular form is intended to include a plurality of elements, and vice versa, unless the contrary context clearly indicates otherwise.

Any implementation described herein as an "example" is not necessarily to be construed as preferred or advantageous over other implementations.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "can" fully encompasses all the meanings of the term "may" and vice versa.

In describing a temporal relationship, when the temporal order is described as, for example, "after," "subsequent," "next," and "before," a case that is not continuous can be included unless a more limiting term, such as "just," "immediate(ly)," or "direct(ly)" is used In describing elements of the present disclosure, the terms "first," "second," "A," "B," "(a)," and "(b)," etc. can be used. These terms can be merely for differentiating one element from another element, and the essence, sequence, order, or number of a corresponding element should not be limited by the terms. For example, a first element could be termed a second element, and, similarly, a second element could be termed a first element, without departing from the scope of the present disclosure.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning, for example consistent with their meaning in the context of the relevant art and should not be interpreted in an idealized or overly formal sense unless expressly so defined herein. For example, the term "part" or "unit" can apply, for example, to a separate circuit or structure, an integrated circuit, a computational block of a circuit device, or any structure configured to perform a described function as should be understood to one of ordinary skill in the art.

Rather, these embodiments can be provided so that this disclosure can be sufficiently thorough and complete to assist those skilled in the art to fully understand the scope of the present disclosure.

It will be apparent to those skilled in the art that various modifications and variations can be made in the display device of the present disclosure without departing from the technical idea or scope of the disclosures. Thus, it is intended that the present disclosure covers the modifications and variations of this disclosure provided they come within the scope of the appended claims and their equivalents.

A display device according to aspects of the present disclosure can be implemented as a television, a video player, a personal computer (PC), a home theater, an automobile electrical device, a smartphone, or the like, but the present disclosure is not limited thereto. The display device according to the present disclosure can be implemented as a light emitting display (LED) device, a quantum dot display (QDD) device, a liquid crystal display (LCD) device, or the like. However, for convenience of description, a light emitting display device that directly emits light based on inorganic light-emitting diodes or organic light-emitting diodes is used as an example of the display device.

In addition, according to aspects of the present disclosure a transistor which will be described below can be implemented as an n-type transistor, a p-type transistor, or a form including both n-type and p-type transistors. The transistor is a three-electrode element including a gate, a source, and a drain. The source is an electrode that supplies carriers to the transistor. In the transistor, carriers start to flow from the source. The drain is an electrode through which carriers leave the transistor. In other words, carriers flow from the source to the drain in the transistor.

In the case of a p-type transistor, holes serve as carriers, and thus a source voltage is higher than a drain voltage such that the holes can flow from the source to the drain. Since the holes flow from the source to the drain in the p-type transistor, the current flows from the source to the drain. In contrast, in the case of an n-type transistor, electrons serve as carriers, and thus the source voltage is lower than the drain voltage such that the electrons can flow from the source to the drain. Since the electrons flow from the source to the drain in the n-type transistor, the current flows from the drain to the source. However, the source and drain of a transistor can be changed depending on the applied voltage. To reflect this, in the following description, one of the source and drain is described as a first electrode, and the other of the source and drain is described as a second electrode.

Figure 2:
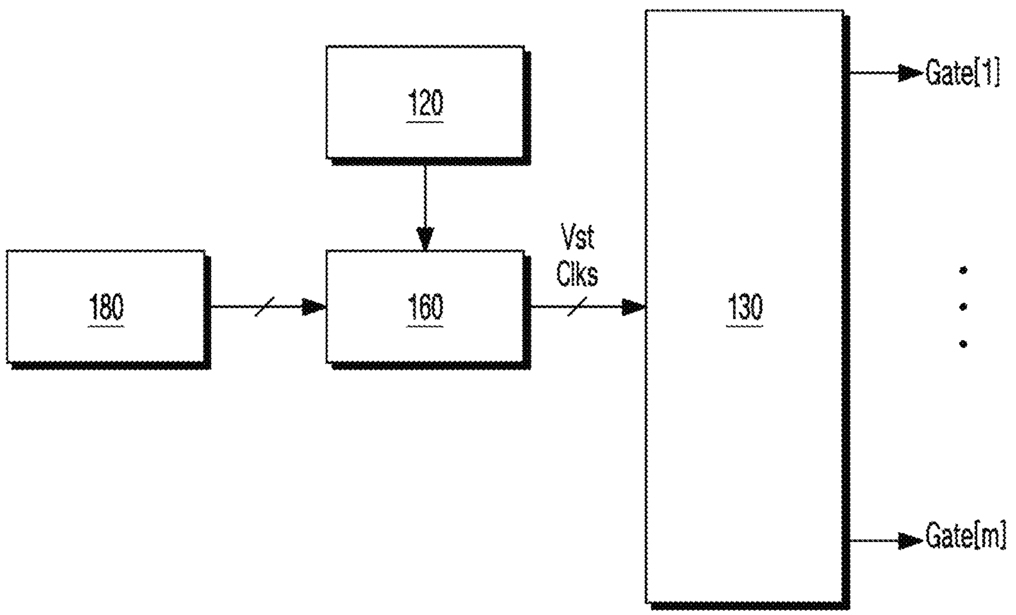
FIG. 2 and FIG. 3 are diagrams illustrating a configuration of a gate-in-panel type gate driver according to aspects of the present disclosure.
Figure 3:
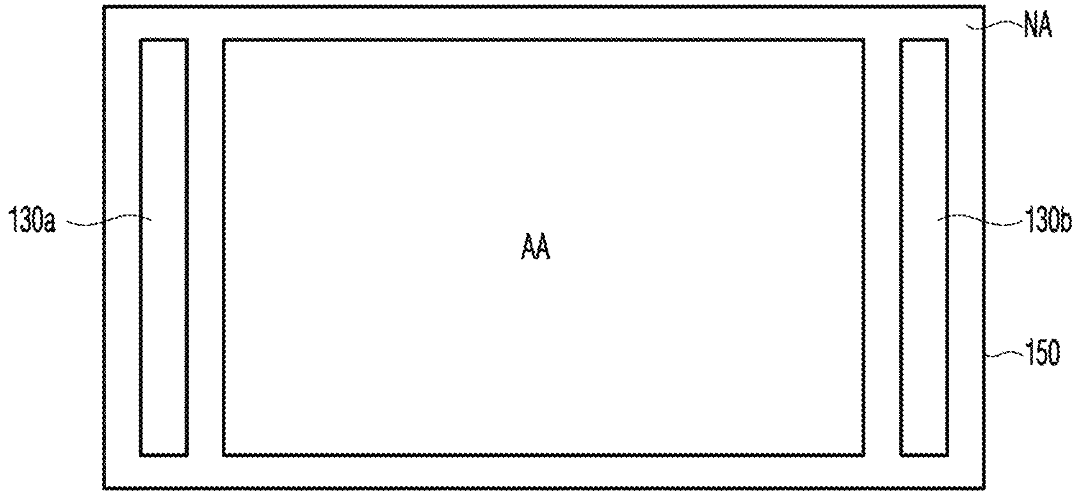

FIG. 1 is a block diagram schematically showing a light-emitting display device, and FIG. 2 and FIG. 3 are diagrams illustrating a configuration of a gate-in-panel type gate driver.

As illustrated in FIG. 1 to FIG. 3, the light-emitting display device can include a timing controller 120, a gate driver 130, a data driver 140, a display panel 150, and a power supply 180.

An image provider (set or host system) 110 can output various driving signals in addition to an image data signal supplied from the outside or an image data signal stored in an internal memory. The image provider 110 can supply a data signal and various driving signals to the timing controller 120.

The timing controller 120 can output a gate timing control signal GDC for controlling the operation timing of the gate driver 130, a data timing control signal DDC for controlling the operation timing of the data driver 140, and various synchronization signals (a vertical synchronization signal Vsync and a horizontal synchronization signal Hsync), etc. The timing controller 120 can supply a data signal DATA supplied from the image provider 110 along with the data timing control signal DDC to the data driver 140. The timing controller 120 can take the form of an integrated circuit (IC) and be mounted on a printed circuit board, but the present disclosure is not limited thereto.

The gate driver 130 can output a gate signal (or a gate voltage) in response to the gate timing control signal GDC supplied from the timing controller 120. The gate driver 130 can supply gate signals to subpixels included in the display panel 150 through gate lines GL1 to GLm. The gate driver 130 can be formed as an IC or directly formed on the display panel 150 in a gate-in-panel structure, but the present disclosure is not limited thereto. However, for convenience of description, a gate-in-panel type gate driver will be described below as an example, as shown in FIG. 2 and FIG. 3.

The gate-in-panel type gate driver 130 can include shift registers 130*a* and 130*b* formed in a gate-in-panel type on one side and the other side of a non-active area NA of the display panel 150. The shift registers 130*a* and 130*b* can be formed in the form of a thin film in the gate-in-panel type in the non-active area NA of the display panel 150. The gate-in-panel type gate driver 130 can output gate signals Gate[1] to Gate[m] for turning on or off transistors formed in the active area AA of the display panel 150.

The gate-in-panel type gate driver 130 can operate based on signals and voltages output from the timing controller 120, the power supply 180, and a level shifter 160. The level shifter 160 can generate gate control signals required for operation of the gate-in-panel type gate driver 130, 130*a*, and 130*b* on the basis of signals and voltages output from the timing controller 120 and the power supply 180.

The data driver 140 can sample and latch a data signal DATA in response to the data timing control signal DDC supplied from the timing controller 120 and convert a digital data signal into an analog data voltage on the basis of a gamma reference voltage and output the analog data voltage. The data driver 140 can supply data voltages to subpixels included in the display panel 150 through data lines DL1 to DLn. The data driver 140 can be formed as an IC and mounted on the display panel 150 or on a printed circuit board, but the present disclosure is not limited thereto.

The power supply 180 can generate a high-level voltage and a low-level voltage based on an external input voltage supplied from the outside, and output the same through a high-level voltage line EVDD and a low-level voltage line EVSS. The power supply 180 can generate and output not only the high-level voltage and the low-level voltage, but also voltages required for operation of the gate driver 130 or voltages required for operation of the data driver 140.

The display panel 150 can be manufactured based on a rigid or flexible substrate such as glass, silicon, or polyimide. The display panel 150 can include a plurality of subpixels SP for displaying an image. The subpixels SP can directly emit light to an upper substrate, a lower substrate, or the upper and lower substrates of the display panel 150. The subpixels SP can emit one of colors, such as red, green, blue, and white. The display panel 150 can display an image based on pixels composed of red subpixels, green subpixels, and blue subpixels, or pixels composed of red subpixels, green subpixels, blue subpixels, and white subpixels.

In the above description, the timing controller 120, the gate driver 130, the data driver 140, etc. are described as separate components. However, depending on the implementation of the light-emitting display device, one or more of the timing controller 120, the gate driver 130, and the data driver 140 can be integrated into one IC.

Figure 4:
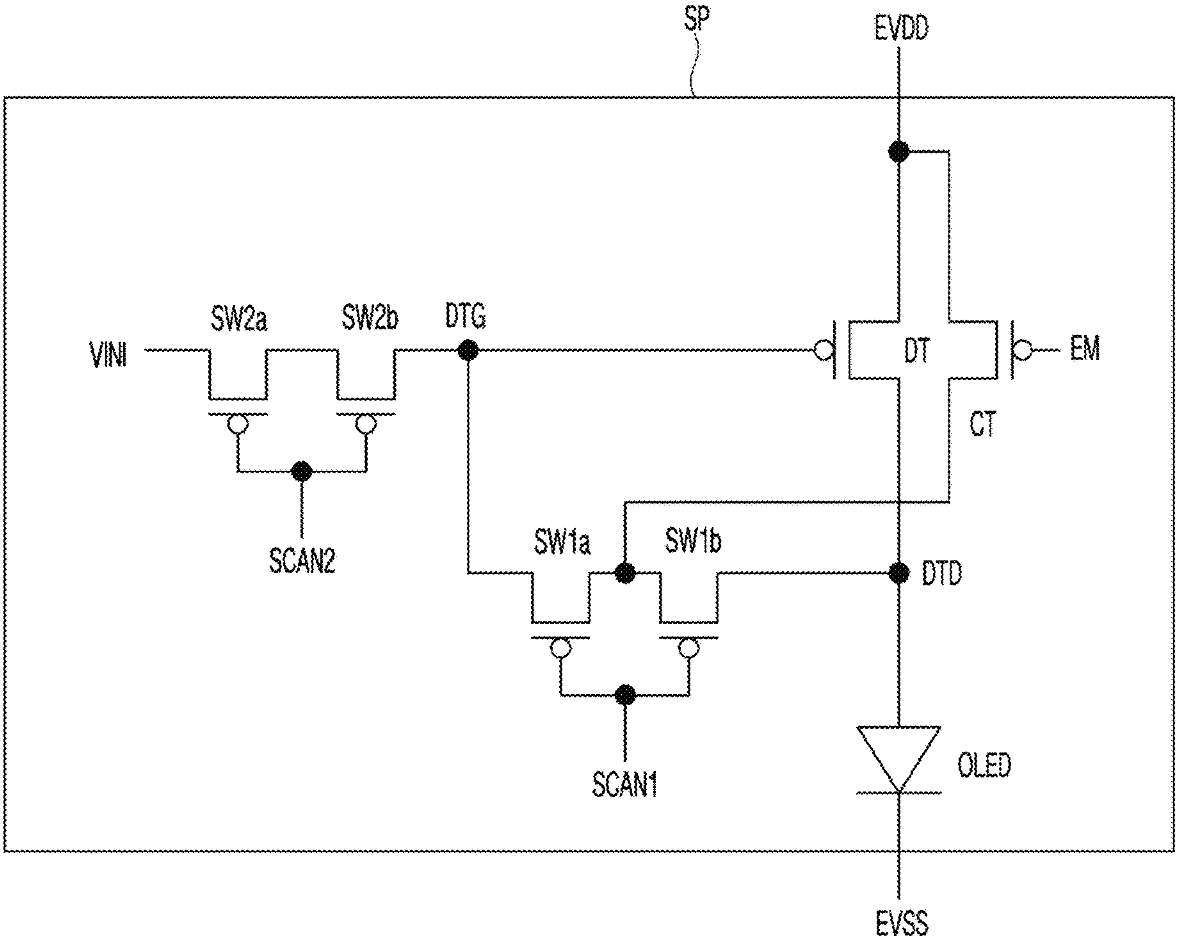
FIG. 4 is a circuit configuration diagram of a subpixel according to a first embodiment of the present disclosure.
Figure 5:
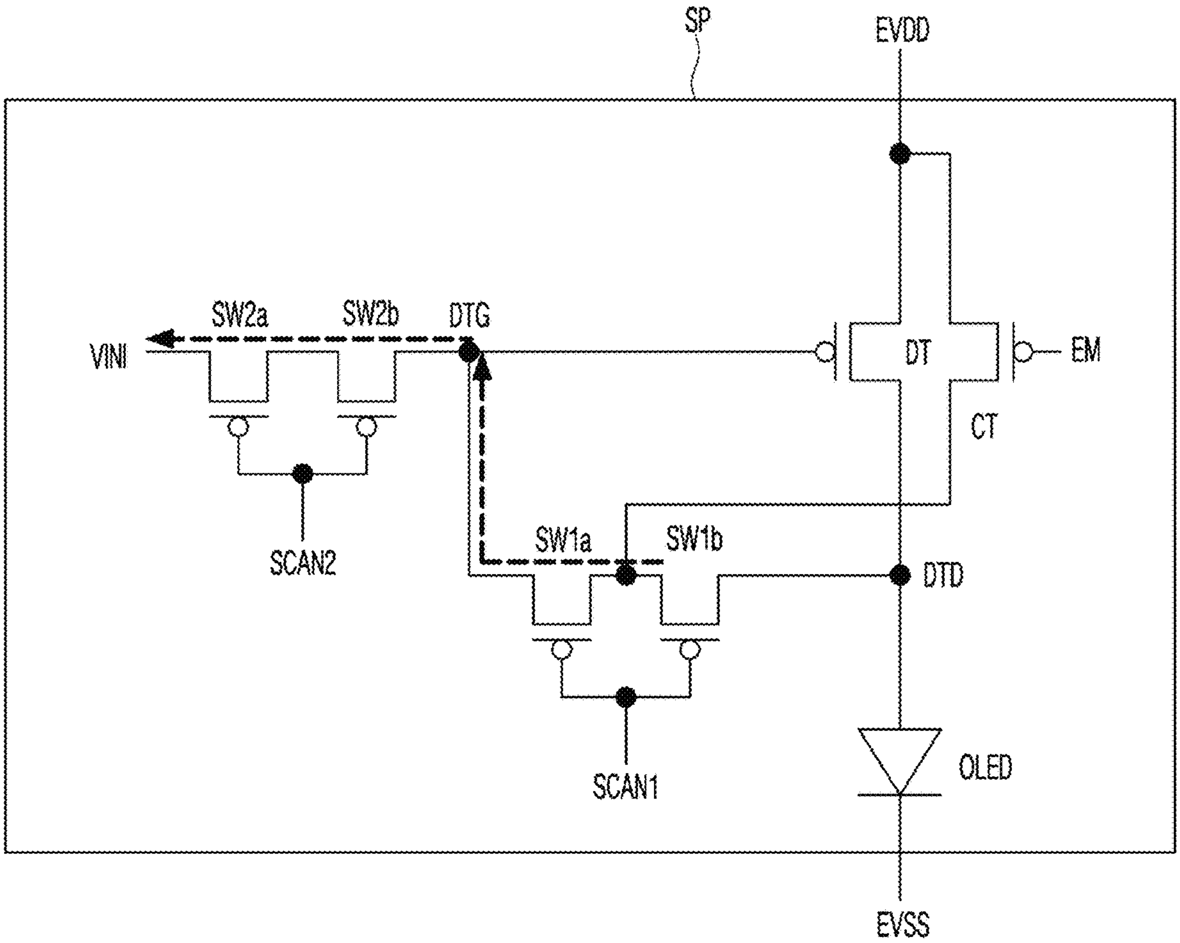
FIG. 5 is a diagram illustrating a part of the operation of the subpixel according to the first embodiment of the present disclosure.

FIG. 4 is a circuit configuration diagram of a subpixel according to a first embodiment of the present disclosure, and FIG. 5 is a diagram illustrating a part of the operation of the subpixel according to the first embodiment.

As illustrated in FIG. 4, the subpixel SP according to the first embodiment can include a first switching transistor SW1*a* and SW1*b*, a second switching transistor SW2*a* and SW2*b*, a driving transistor DT, a compensation transistor CT, and a light-emitting diode OLED.

According to the first embodiment, an example in which the first switching transistor SW1*a* and SW1*b*, the second switching transistor SW2*a* and SW2*b*, the driving transistor DT, and the compensation transistor CT are p-type low-temperature polycrystalline silicon (LTPS) transistors is described, but the present disclosure is not limited thereto.

The first switching transistor SW1*a* and SW1*b* can have a gate electrode connected to a first scan line SCAN1, a first electrode connected to a gate node DTG of the driving transistor DT, and a second electrode connected to a drain node DTD of the driving transistor DT. The first switching transistor SW1*a* and SW1*b* can include a first A switching transistor SW1*a* and a first B switching transistor SW1*b* to suppress (reduce or prevent) the occurrence of leakage current. For example, the first switching transistor SW1*a* and SW1*b* can be implemented with a double transistor structure.

The first A switching transistor SW1*a* and the first B switching transistor SW1*b* can be simultaneously turned on in response to a first scan signal applied through the first scan line SCAN1. When the first A switching transistor SW1*a* and the first B switching transistor SW1*b* are turned on, the gate node DTG and the drain node DTD of the driving transistor DT can be interconnected (diode-connected). The subpixel SP can turn on the first A switching transistor SW1*a* and the first B switching transistor SW1*b* when the threshold voltage of the driving transistor DT is sampled.

The second switching transistor SW2*a* and SW2*b* can have a gate electrode connected to a second scan line SCAN2, a first electrode connected to an initialization voltage line VINI, and a second electrode connected to the gate node DTG of the driving transistor DT and the first electrode of the first A switching transistor SW1*a*. The second switching transistor SW2*a* and SW2*b* can include a second A switching transistor SW2*a* and a second B switching transistor SW2*b* in order to suppress (reduce or prevent) the occurrence of leakage current. For example, the second switching transistor SW2*a* and SW2*b* can be implemented in a double transistor structure.

The second A switching transistor SW2*a* and the second B switching transistor SW2*b* can be turned on simultaneously in response to a second scan signal applied through the second scan line SCAN2. When the second A switching transistor SW2*a* and the second B switching transistor SW2*b* are turned on, an initialization voltage can be applied to the gate node DTG of the driving transistor DT. When the subpixel SP can turn on the second A switching transistor SW2*a* and the second B switching transistor SW2*b* when the gate node DTG of the driving transistor DT is initialized.

The driving transistor DT can have a gate electrode connected to the gate node DTG, a first electrode connected to a high-level voltage line EVDD, and a second electrode connected to the drain node DTD, the second electrode of the first B switching transistor SW1*b*, and the anode of the light-emitting diode OLED. The driving transistor DT can generate a driving current to be supplied to the light-emitting diode OLED. The subpixel SP can emit light based on the driving current generated from the driving transistor DT and express a specific grayscale.

The compensation transistor CT can have a gate electrode connected to a control line EM, a first electrode connected to the first electrode of the driving transistor DT and the high-level voltage line EVDD, and a second electrode connected to a connection point between the second electrode of the first A switching transistor SW1*a* and the first electrode of the first B switching transistor SW1*b*. The compensation transistor CT can serve to block (eliminate) a leakage path generated between the gate node DTG and the drain node DTD of the driving transistor DT.

The compensation transistor CT is turned on in response to a control signal applied through the control line EM. When the compensation transistor CT is turned on, a high-level voltage applied through the high-level voltage line EVDD can be transmitted to the connection point between the second electrode of a first A switching transistor SW1*a* and the first electrode of a first B switching transistor SW1*b*. The subpixel SP can turn on the compensation transistor CT when causing the light-emitting diode OLED to emit light.

The light-emitting diode OLED can have the anode connected to the drain node DTD and the second electrode of the first B switching transistor SW1*b* and a cathode connected to a low-level voltage line EVSS. The light-emitting diode OLED can emit light based on a driving current. The subpixel SP can cause the light-emitting diode OLED to emit light when displaying an image.

As illustrated in FIG. 5, the subpixel SP according to the first embodiment can turn on the compensation transistor CT when causing the light-emitting diode OLED to emit light. During an emission period of the subpixel SP, the first switching transistor SW1*a* and SW1*b* and the second switching transistor SW2*a* and SW2*b* can be in a floating state.

Although the first switching transistor SW1*a* and SW1*b* and the second switching transistor SW2*a* and SW2*b* are implemented in a double transistor structure as described above, it can be difficult to completely eliminate (prevent) high leakage current due to the characteristics of the LTPS element.

However, if the compensation transistor CT is turned on during the emission period of the subpixel SP as in the first embodiment, a leakage path formed in the direction of the drain node DTD in the first switching transistor SW1*a* and SW1*b* can be set to the second switching transistor SW2*a* and SW2*b* located in the direction of the gate node DTG. For example, the two leakage paths of the first switching transistor SW1*a* and SW1*b* and the second switching transistor SW2*a* and SW2*b* can be reduced to one leakage path.

When the compensation transistor CT is turned on, the high-level voltage can be applied to the connection point between the second electrode of the first A switching transistor SW1*a* and the first electrode of the first B switching transistor SW1*b*. In this case, the leakage path from the first switching transistor SW1*a* and SW1*b* to the drain node DTD can be removed by the high-level voltage applied to the connection point.

In this way, the subpixel SP according to the first embodiment can turn on the compensation transistor CT when causing the light-emitting diode OLED to emit light such that the leakage path from the first switching transistor SW1*a* and SW1*b* to the drain node DTD is removed.

Figure 6:
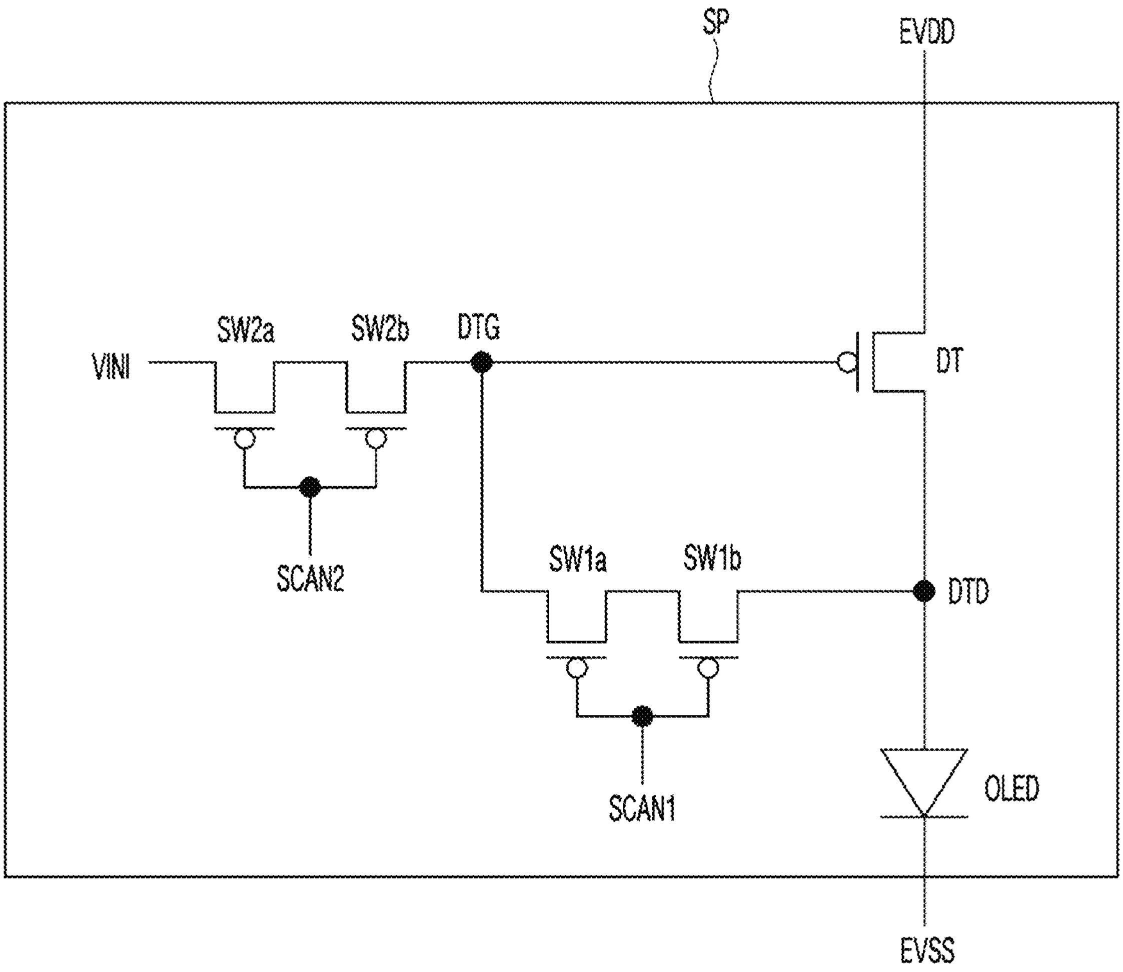
FIG. 6 is a circuit configuration diagram of a subpixel according to an experimental example of the present disclosure.
Figure 7:
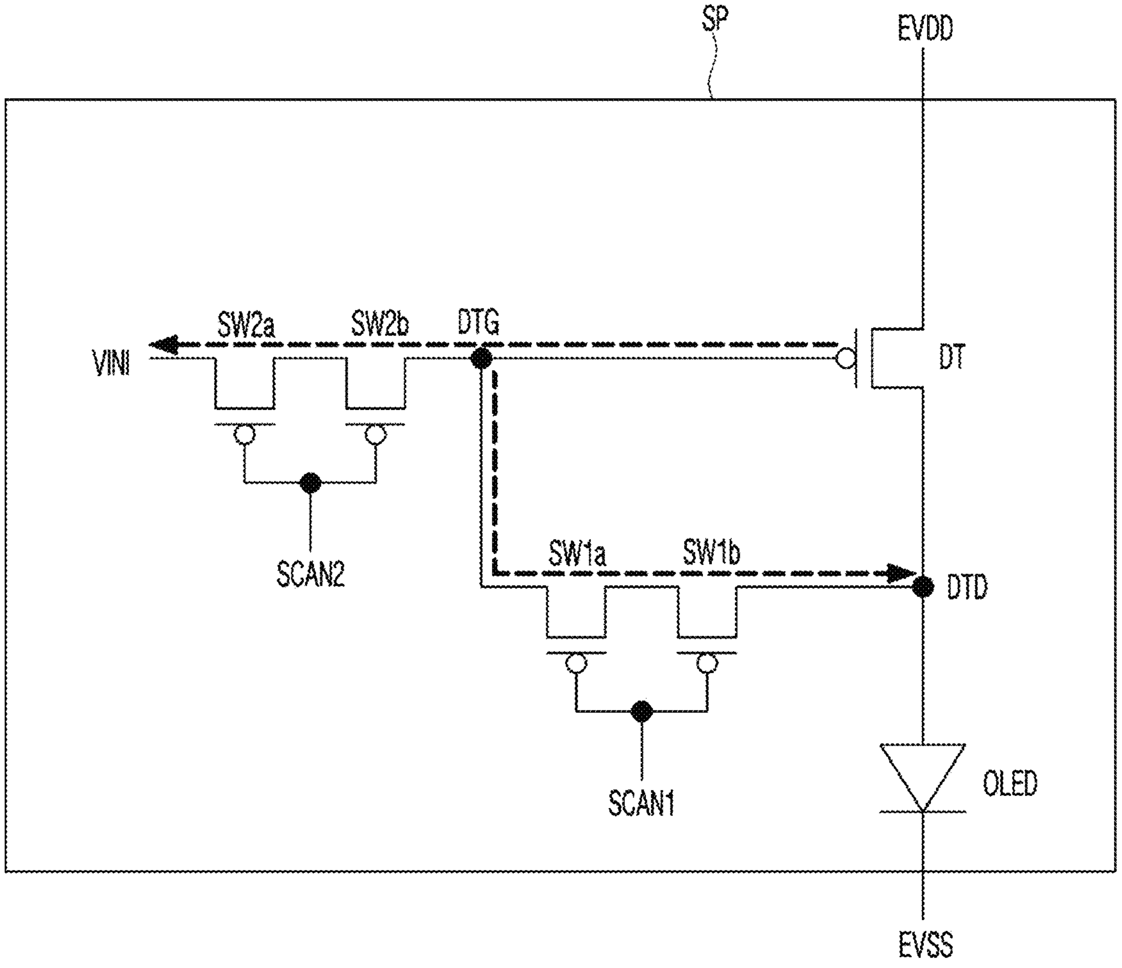
FIG. 7 is a diagram illustrating a part of the operation of the subpixel according to the experimental example of the present disclosure.

FIG. 6 is a circuit configuration diagram of a subpixel according to an experimental example of the present disclosure, and FIG. 7 is a diagram illustrating a part of the operation of the subpixel according to the experimental example of the present disclosure.

As illustrated in FIG. 6, the subpixel SP according to the experimental example can include a first switching transistor SW1*a* and SW1*b*, a second switching transistor SW2*a* and SW2*b*, a driving transistor DT, and a light-emitting diode OLED.

According to the experimental example, the first switching transistor SW1*a* and SW1*b*, the second switching transistor SW2*a* and SW2*b*, and the driving transistor DT can be p-type LTPS transistors.

As illustrated in FIG. 7, the subpixel SP according to the experimental example has the same or substantially same connection structure as the embodiment, but has a difference in that it does not include a compensation transistor. Therefore, the subpixel SP according to the experimental example can cause current leakage through a first leakage path formed from the first switching transistor SW1*a* and SW1*b* to the drain node DTD and a second leakage path formed from the gate node DTG to the second switching transistor SW2*a* and SW2*b*. For example, the subpixel SP according to the experimental example has two leakage paths.

Figure 8:
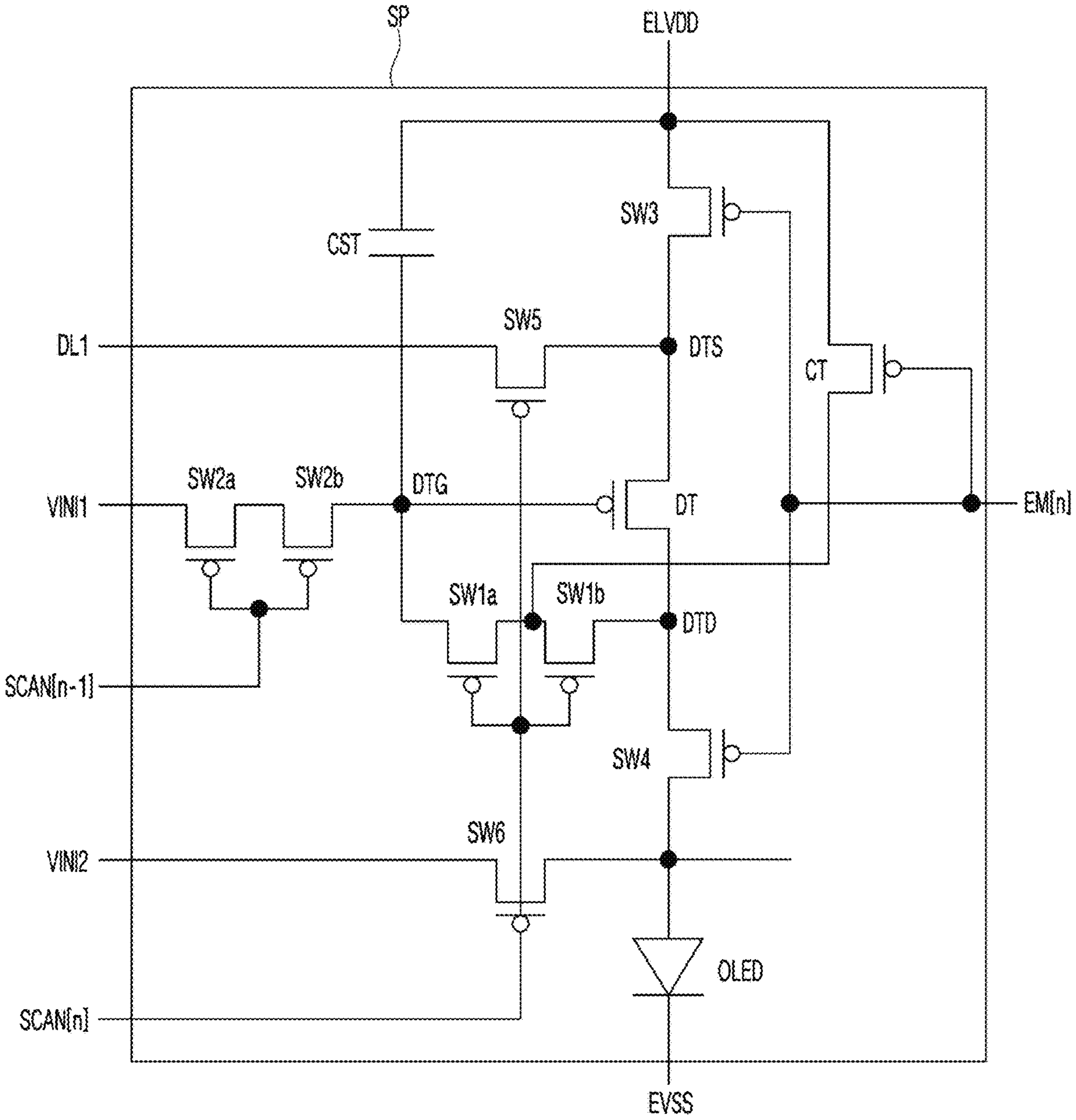
FIG. 8 is a circuit configuration diagram of a subpixel according to a second embodiment of the present disclosure.
Figure 9:
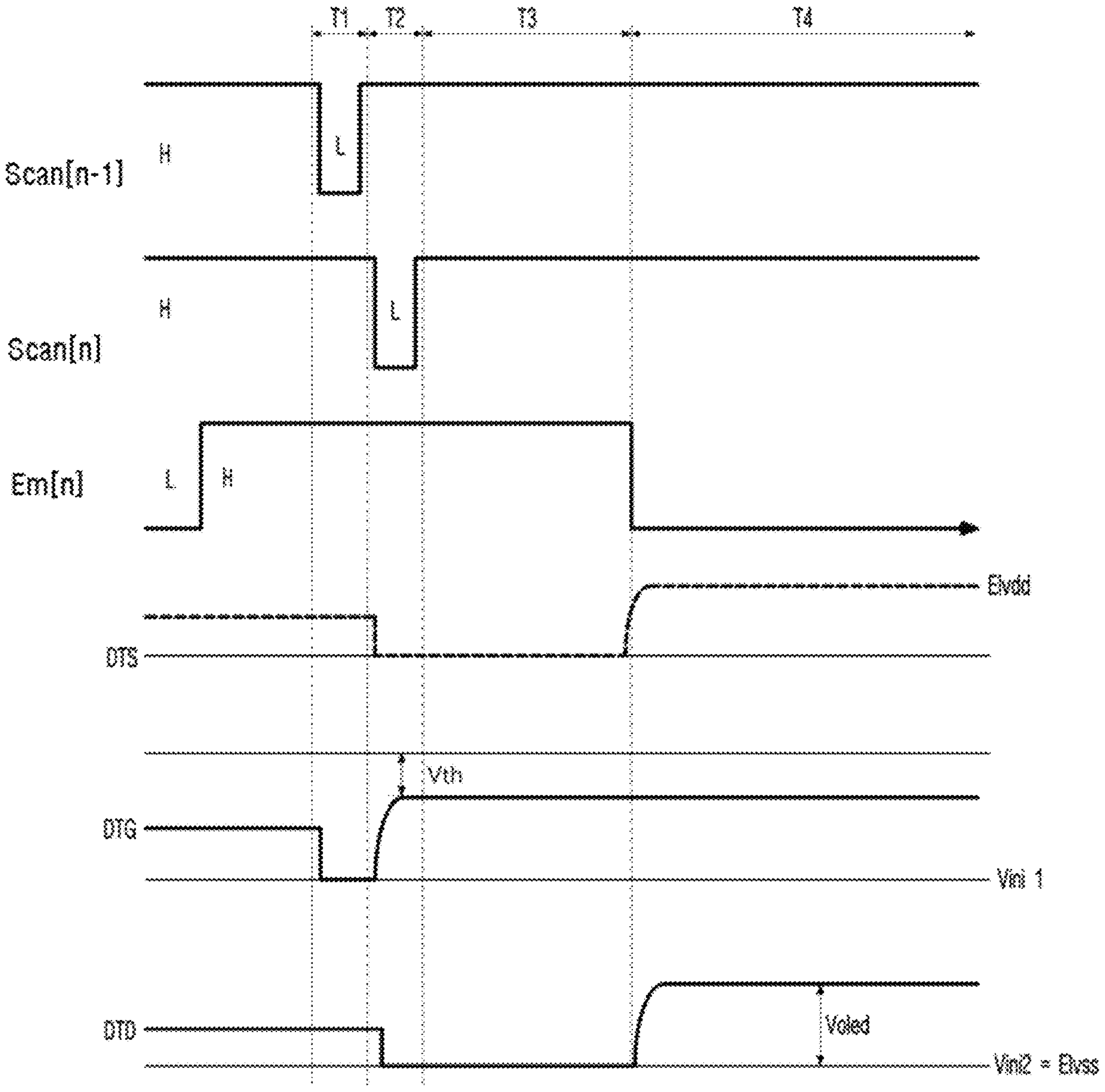
FIG. 9 is a driving waveform diagram of the second embodiment shown in FIG. 8, and FIG. 10 to FIG. 13 are diagrams illustrating operation states of the circuit in respective periods according to the second embodiment of the present disclosure.

FIG. 8 is a circuit configuration diagram of a subpixel according to a second embodiment of the present disclosure, FIG. 9 is a driving waveform diagram of the second embodiment illustrated in FIG. 8, and FIG. 10 to FIG. 13 are diagrams illustrating operation states of the circuit in respective periods according to the second embodiment.

As illustrated in FIG. 8, the subpixel SP according to the second embodiment can include a first switching transistor SW1*a* and SW1*b*, a second switching transistor SW2*a* and SW2*b*, a driving transistor DT, a compensation transistor CT, a third switching transistor SW3, a fourth switching transistor SW4, a fifth switching transistor SW5, a sixth switching transistor SW6, a capacitor CST, and a light-emitting diode OLED.

The first switching transistor SW1*a* and SW1*b* can have a gate electrode connected to an Nth scan line SCAN[n], a first electrode connected to a gate node DTG of the driving transistor DT, and a second electrode connected to a drain node DTD of the driving transistor DT. The first switching transistor SW1*a* and SW1*b* can include a first A switching transistor SW1*a* and a first B switching transistor SW1*b* in order to suppress (reduce or prevent) the occurrence of leakage current. For example, the first switching transistor SW1*a* and SW1*b* can be implemented in a double transistor structure.

The first A switching transistor SW1*a* can have a gate electrode connected to the Nth scan line SCAN[n], a first electrode connected to the gate node DTG of the driving transistor DT, and a second electrode connected to a first electrode of the first B switching transistor SW1*b*. The first B switching transistor SW1*b* can have a gate electrode connected to the Nth scan line SCAN[n], the first electrode connected to the second electrode of the first A switching transistor SW1*a*, and a second electrode connected to the drain node DTD of the driving transistor DT. Here, N can be a real number such as a positive integer.

The first A switching transistor SW1*a* and the first B switching transistor SW1*b* can be turned on simultaneously in response to an Nth scan signal (a scan signal of a current horizontal line) applied through the Nth scan line SCAN[n]. When the first A switching transistor SW1*a* and the first B switching transistor SW1*b* are turned on, the gate node DTG and the drain node DTD of the driving transistor DT can be interconnected (diode-connected). The subpixel SP can turn on the first A switching transistor SW1*a* and the first B switching transistor SW1*b* when a threshold voltage of the driving transistor DT is sampled.

The second switching transistor SW2*a* and SW2*b* can have a gate electrode connected to the (N−1)th scan line SCAN[n−1], a first electrode connected to a first initialization voltage line VINI1, and a second electrode connected to the gate node DTG of the driving transistor DT and the first electrode of the first A switching transistor SW1*a*. The second switching transistor SW2*a* and SW2*b* can include a second A switching transistor SW2*a* and a second B switching transistor SW2*b* in order to suppress (reduce or prevent) the occurrence of leakage current. For example, the second switching transistor SW2*a* and SW2*b* can be implemented in a double transistor structure.

The second A switching transistor SW2*a* can have a gate electrode connected to the (N−1)th scan line SCAN[n−1], a first electrode connected to the first initialization voltage line VINI1, and a second electrode connected to a first electrode of the second B switching transistor SW2*b*. The second B switching transistor SW2*b* can have a gate electrode connected to the (N−1)th scan line SCAN[n−1], the first electrode connected to the second electrode of the second A switching transistor SW2*a*, and a second electrode connected to the gate node DTG of the driving transistor DT.

The second A switching transistor SW2*a* and the second B switching transistor SW2*b* can be turned on simultaneously in response to an (N−1)th scan signal (a scan signal of a previous horizontal line) applied through the (N−1)th scan line SCAN[n−1]. When the second A switching transistor SW2*a* and the second B switching transistor SW2*b* are turned on, a first initialization voltage can be applied to the gate node DTG of the driving transistor DT. The subpixel SP can turn on the second A switching transistor SW2*a* and the second B switching transistor SW2*b* when the gate node DTG of the driving transistor DT is initialized.

The driving transistor DT can have a gate electrode connected to a second electrode of the capacitor CST and the gate node DTG, a first electrode connected to a source node DTS, and a second electrode connected to the drain node DTD, the second electrode of the first B switching transistor SW1*b*, and a first electrode of the fourth switching transistor SW4. The driving transistor DT can generate a driving current to be supplied to the light-emitting diode OLED. The subpixel SP can emit light based on the driving current generated from the driving transistor DT and express a specific grayscale.

The compensation transistor CT can have a gate electrode connected to an Nth control line EM[n], a first electrode connected to a first electrode of the third switching transistor SW3 and a high-level voltage line EVDD, and a second electrode connected to a connection point between the second electrode of the first A switching transistor SW1*a* and the first electrode of the first B switching transistor SW1*b*. The compensation transistor CT can serve to block (remove) a leakage path generated between the gate node DTG and the drain node DTD of the driving transistor DT.

The compensation transistor CT can be turned on in response to an Nth control signal (a control signal of the current horizontal line) applied through the Nth control line EM[n]. When the compensation transistor CT is turned on, a high-level voltage applied through the high-level voltage line EVDD can be transmitted to the connection point between the second electrode of the first A switching transistor SW1*a* and the first electrode of the first B switching transistor SW1*b*. The subpixel SP can turn on the compensation transistor CT when causing the light-emitting diode OLED to emit light.

The third switching transistor SW3 can have a gate electrode connected to the Nth control line EM[n], a first electrode connected to the high-level voltage line EVDD, and a second electrode connected to a second electrode of the fifth switching transistor SW5 and the source node DTS of the driving transistor (DT).

The third switching transistor SW3 is turned on in response to the Nth control signal applied through the Nth control line EM[n]. When the third switching transistor SW3 is turned on, the high-level voltage applied through the high-level voltage line EVDD can be transmitted to the first electrode of the driving transistor DT. The subpixel SP can turn on the third switching transistor SW3 when causing the light-emitting diode OLED to emit light. The third switching transistor SW3 can be defined as a first control transistor.

The fourth switching transistor SW4 can have a gate electrode connected to the Nth control line EM[n], a first electrode connected to the drain node DTD of the driving transistor DT, and a second electrode connected to a second electrode of the sixth switching transistor SW6 and the anode of the light-emitting diode OLED.

The fourth switching transistor SW4 is turned on in response to the Nth control signal applied through the Nth control line EM[n]. When the fourth switching transistor SW4 is turned on, the driving current generated from the driving transistor DT can be transmitted to the anode of the light-emitting diode OLED. The subpixel SP can turn on the fourth switching transistor SW4 when causing the light-emitting diode OLED to emit light. The fourth switching transistor SW4 can be defined as a second control transistor.

The fifth switching transistor SW5 can have a gate electrode connected to the Nth scan line SCAN[n], a first electrode connected to a first data line DL1, and a second electrode connected to the second electrode of the third switching transistor SW3 and the source node DTS of the driving transistor DT.

The fifth switching transistor SW5 is turned on in response to the Nth scan signal applied through the Nth scan line SCAN[n]. When the fifth switching transistor SW5 is turned on, a data voltage applied through the first data line DL1 can be transmitted to the second electrode of the capacitor CST through the source and drain nodes DTS and DTD of the driving transistor DT and the first switching transistor SW1*a* and SW1*b*. The subpixel SP can turn on the first switching transistor SW1*a* and SW1*b* along with the fifth switching transistor SW5 when the data voltage is stored in the capacitor CST.

The sixth switching transistor SW6 can have a gate electrode connected to the Nth scan line SCAN[n], a first electrode connected to a second initialization voltage line VINI2, and a second electrode connected to the second electrode of the fourth switching transistor SW4 and the anode of the light-emitting diode OLED. The first initialization voltage applied through the first initialization voltage line VINI1 and a second initialization voltage applied through the second initialization voltage line VINI2 can have different levels.

The sixth switching transistor SW6 is turned on in response to the Nth scan signal applied through the Nth scan line SCAN[n]. When the sixth switching transistor SW6 is turned on, the second initialization voltage applied through the second initialization voltage line VINI2 can be transmitted to the anode of the light-emitting diode OLED. The subpixel SP can sense (or sample) the threshold voltage of the driving transistor DT, write a data voltage, and turn on the sixth switching transistor SW6 when initializing the anode of the light-emitting diode OLED.

The capacitor CST can have a first electrode connected to the first electrode of the third switching transistor SW3 and the high-level voltage line EVDD, and the second electrode connected to the first electrode of the first A switching transistor SW1*a*, the second electrode of the second B switching transistor SW2*b*, and the gate node DTG of the driving transistor DT.

The capacitor CST can store the data voltage applied through the first data line DL1 when the first switching transistor SW1*a* and SW1*b*, the fifth switching transistor SW5, and the sixth switching transistor SW6 are turned on. The light-emitting diode OLED can have the anode connected to the second electrode of the fourth switching transistor SW4 and the second electrode of the sixth switching transistor SW6, and a cathode connected to a low-level voltage line EVSS. The light-emitting diode OLED can emit light based on the driving current. The subpixel SP can cause the light-emitting diode OLED to emit light when expressing an image.

According to the second embodiment, the high-level voltage line EVDD, the first initialization voltage line VINI1, and the second initialization voltage line VINI2 can be included in voltage lines for applying voltages to all subpixels disposed on the display panel. At least one of the high-level voltage line EVDD, the first initialization voltage line VINI1, or the second initialization voltage line VINI2 can include a branch line and can be disposed in a mesh form.

According to the second embodiment, the first switching transistor SW1*a* and SW1*b*, the second switching transistor SW2*a* and SW2*b*, the driving transistor DT, the compensation transistor CT, the third switching transistor SW3, the fourth switching transistor SW4, the fifth switching transistor SW5, and the sixth switching transistor SW6 can be implemented using p-type low-temperature polycrystalline silicon (LTPS).

However, the configuration of the subpixel according to the second embodiment is merely an example and is not limited thereto and can be modified into other forms. For example, transistors, voltage lines, signal lines, etc. can be added or deleted, or the circuit connection relationship can be modified accordingly.

As illustrated in FIG. 8 and FIG. 9, the subpixel SP according to the second embodiment can operate in the order of an initialization period T1, a sensing and data write period T2, a sustain period T3, and an emission period T4.

The states of voltages (signals) applied through signal lines during the initialization period T1 are as follows. The N−1 scan signal Scan[n−1] can be applied as a low voltage L, the N-th scan signal Scan[n] can be applied as a high voltage H, and the N-th control signal Em[n] can be applied as a high voltage H.

The states of voltages (signals) applied through signal lines during the sensing and data write period T2 are as follows. The (N−1)th scan signal Scan[n−1] can be applied as a high voltage H, the Nth scan signal Scan[n] can be applied as a low voltage L, and the Nth control signal Em[n] can be applied as a high voltage H.

The states of voltages (signals) applied through signal lines during the sustain period T3 are as follows. The (N−1)th scan signal Scan[n−1], the Nth scan signal Scan[n], and the Nth control signal Em[n] can be applied as a high voltage (H).

The states of voltages (signals) applied through signal lines during the emission period T4 are as follows. The (N−1)th scan signal Scan[n−1] and the Nth scan signal Scan[n] can be applied as a high voltage H, and the Nth control signal Em[n] can be applied as a low voltage L.

According to the second embodiment, the Nth scan line SCAN[n] and the Nth control line EM[n] can be included in a signal line to which signals for controlling subpixels disposed in one horizontal line on the display panel (for example, subpixels disposed in GL1 in FIG. 1) are applied. Accordingly, the Nth scan line SCAN[n] and the Nth control line EM[n] can be included in an Nth gate line, and the (N−1)th scan line SCAN[n−1] can be included in an (N−1)th gate line located before the Nth gate line. Here, n means an arbitrary position in gate lines.

FIG. 10 to FIG. 13 are diagrams showing operation states of the subpixel according to the driving waveforms of FIG. 9.

Figure 10:
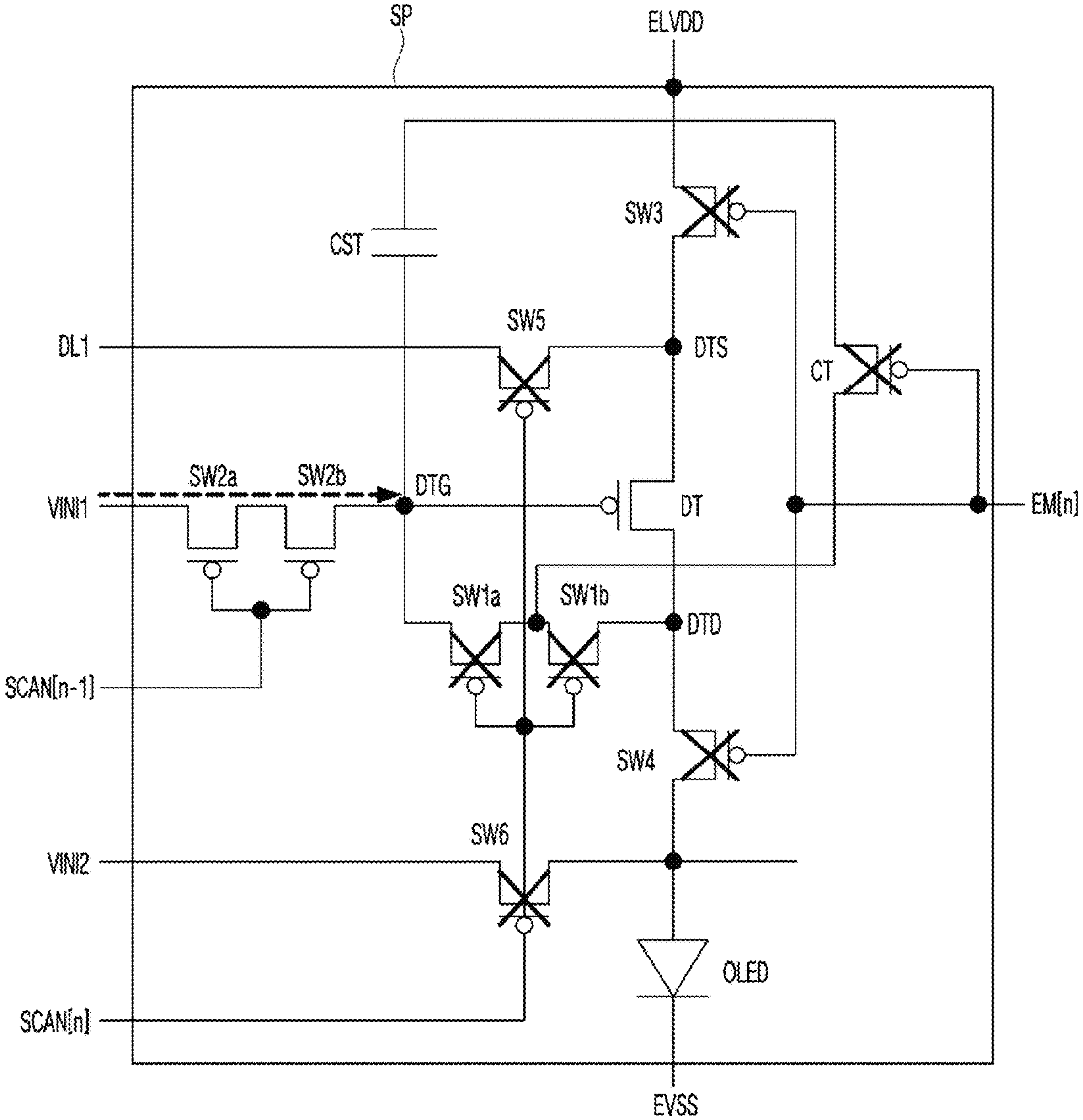

As illustrated in FIG. 9 and FIG. 10, the second switching transistor SW2*a* and SW2*b* can be turned on during the initialization period T1. On the other hand, the first switching transistor SW1*a* and SW1*b*, the third switching transistor SW3, the fourth switching transistor SW4, the fifth switching transistor SW5, the sixth switching transistor SW6, the driving transistor DT, and the compensation transistor CT can be turned off.

During the initialization period T1, the gate node DTG of the driving transistor DT can be initialized on the basis of a first initialization voltage Vini1 as the second switching transistor SW2*a* and SW2*b* is turned on. Accordingly, the capacitor CST can be initialized.

Figure 11:
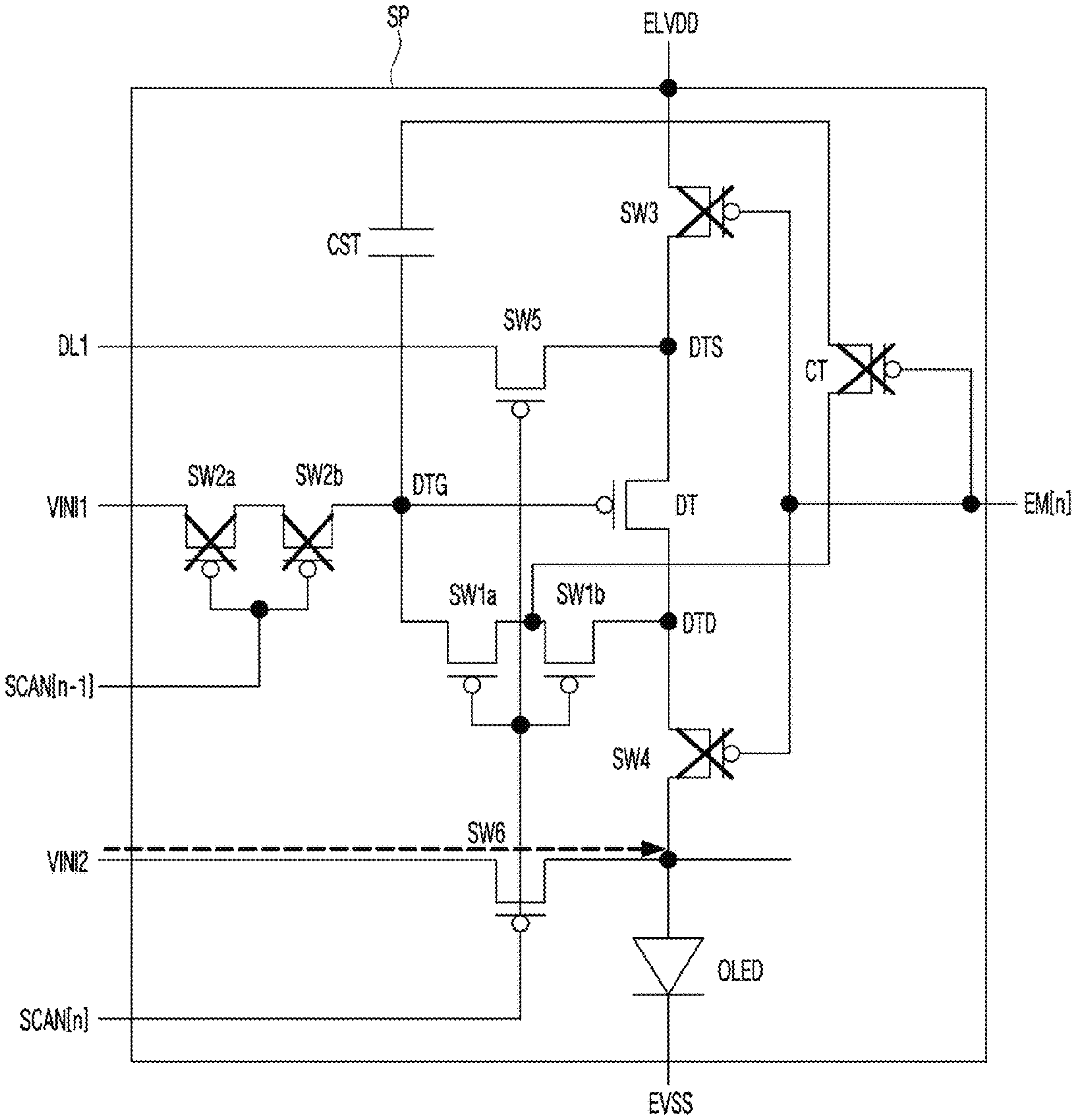

As illustrated in FIG. 9 and FIG. 11, during the sensing and data write period T2, the first switching transistor SW1*a* and SW1*b*, the fifth switching transistor SW5, the sixth switching transistor SW6, and the driving transistor DT can be turned on. On the other hand, the second switching transistor SW2*a* and SW2*b*, the third switching transistor SW3, the fourth switching transistor SW4, and the compensation transistor CT can be turned off.

During the sensing and data write period T2, as the first switching transistor SW1*a* and SW1*b* is turned on, the driving transistor DT can be in a diode-connected state in which the threshold voltage Vth of the driving transistor DT can be sensed (or sampled). As the fifth switching transistor SW5 is turned on, the data voltage applied through the first data line DL1 can be transmitted to the second electrode of the capacitor CST (or gate node) through the driving transistor DT and the first switching transistor SW1*a* and SW1*b*. As the sixth switching transistor SW6 is turned on, the anode of the light-emitting diode OLED can be initialized on the basis of the second initialization voltage Vini2. Meanwhile, although FIG. 9 illustrates an example in which a second initialization voltage Vini2 and a low-level voltage Elvss have the same or substantially same level, the present disclosure is not limited thereto.

Figure 12:
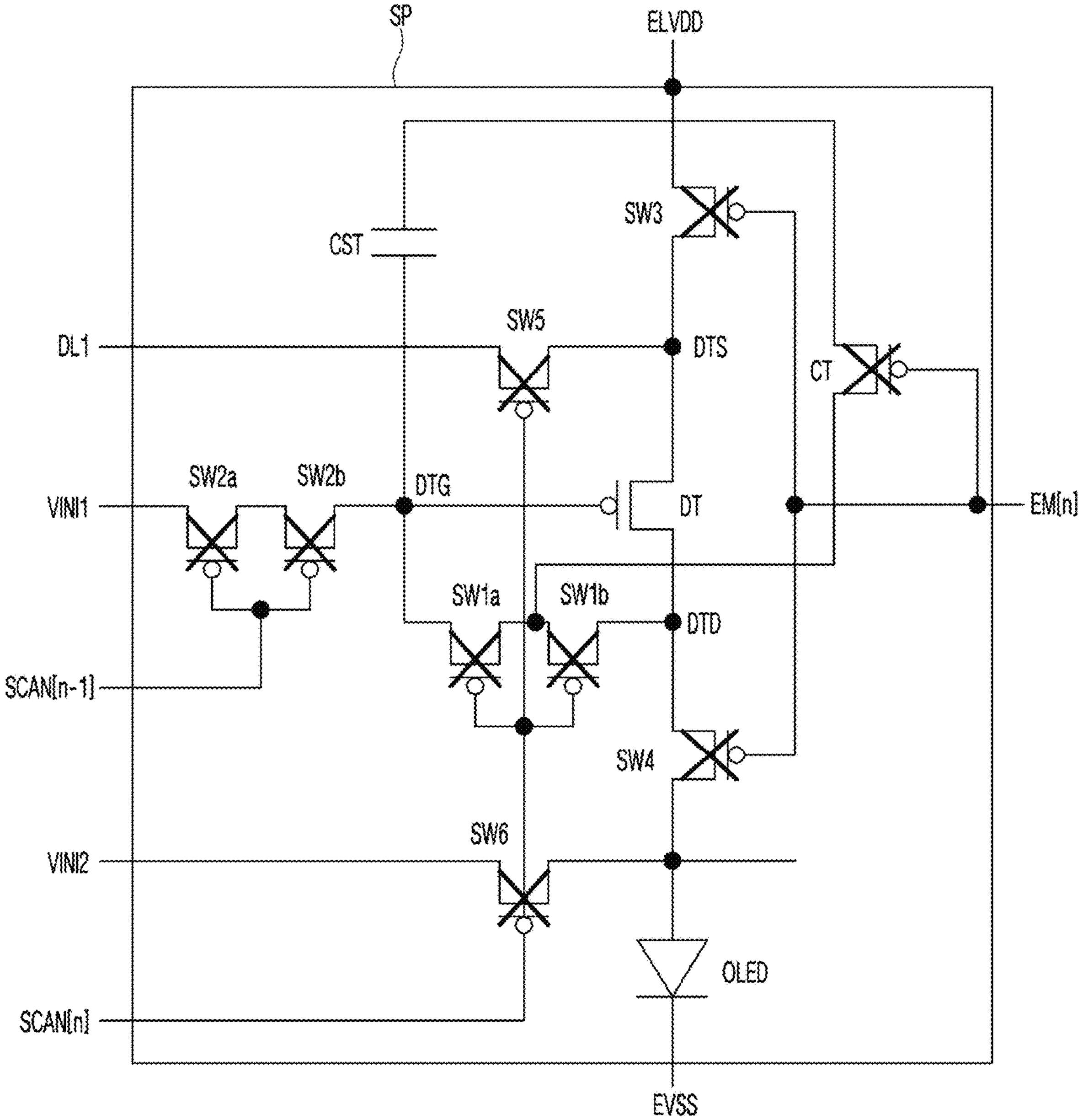

As illustrated in FIG. 9 and FIG. 12, during the sustain period T3, the first switching transistor SW1*a* and SW1*b*, the second switching transistor SW2*a* and SW2*b*, the third switching transistor SW3, the fourth switching transistor SW4, the fifth switching transistor SW5, the sixth switching transistor SW6, the driving transistor DT, and the compensation transistor CT can be turned off.

As the first switching transistor SW1*a* and SW1*b*, the second switching transistor SW2*a* and SW2*b*, the third switching transistor SW3, the fourth switching transistor SW4, the fifth switching transistor SW5, the sixth switching transistor SW6, the driving transistor DT, and the compensation transistor CT are turned off during the sustain period T3, the voltage of each node can be maintained at a value set in the previous period.

Figure 13:
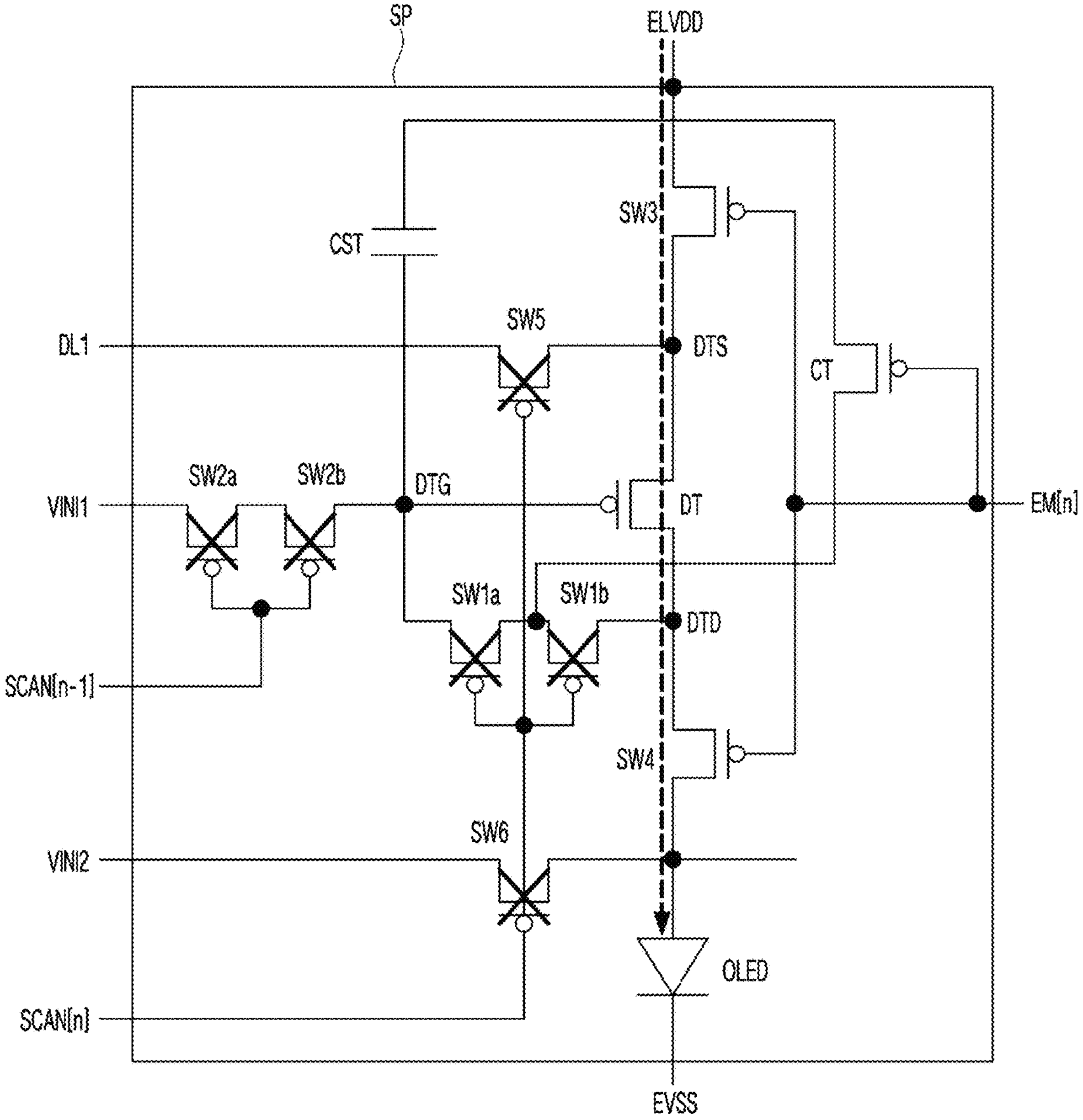

As illustrated in FIG. 9 and FIG. 13, during the emission period T4, the third switching transistor SW3, the fourth switching transistor SW4, the driving transistor DT, and the compensation transistor CT can be turned on. On the other hand, the first switching transistors SW1*a* and SW1*b*, the second switching transistors SW2*a* and SW2*b*, the fifth switching transistor SW5, and the sixth switching transistor SW6 can be turned off.

As the third switching transistor SW3, the fourth switching transistor SW4, and the driving transistor DT are turned on during the emission period T4, the light-emitting diode OLED can emit light in response to the driving current generated from the driving transistor DT. During the emission period T4, the voltage of the source node DTS of the driving transistor DT can rise by a high-level voltage Elvdd, and the voltage of the drain node DTD of the driving transistor DT can rise by a grayscale voltage Voled.

In addition, as the compensation transistor CT is turned on, the high-level voltage can be applied to a connection point between the second electrode of the first A switching transistor SW1*a* and the first electrode of the first B switching transistor SW1*b*. In this case, the leakage path formed in the direction of the drain node DTD in the first switching transistor SW1*a* and SW1*b* can be changed to the second switching transistor SW2*a* and SW2*b* located in the direction of the gate node DTG. For example, the leakage path from the first switching transistor SW1*a* and SW1*b* to the drain node DTD can be removed by the high-level voltage applied to the connection point. As a result, the leakage path can remain only in the direction from the gate node DTG to the second switching transistor SW2*a* and SW2*b*.

Meanwhile, in the second embodiment, an example in which the compensation transistor CT is included in one subpixel SP has been illustrated and described. However, the compensation transistor CT can be disposed for each horizontal line on the display panel. For example, the configuration can be modified such that one compensation transistor CT is disposed per gate line. In this case, the compensation transistor CT can be disposed outside, not inside, the subpixel SP in order to reduce or prevent decrease in the aperture ratio. In addition, when the compensation transistor CT is disposed outside the subpixel SP, only the signal line connected to the connection point between the second electrode of the first A switching transistor SW1*a* and the first electrode of the first B switching transistor SW1*b* included in each subpixel can be commonly connected to the second electrode of the compensation transistor CT.

Figure 14:
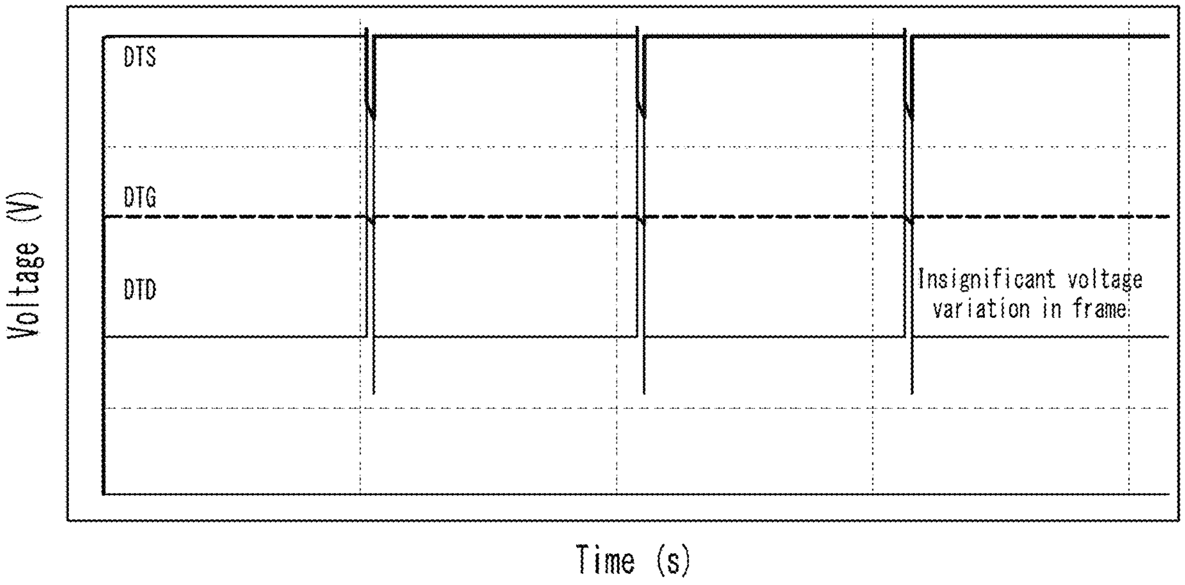
FIG. 14 and FIG. 15 show simulation results obtained from the subpixel of the second embodiment of the present disclosure.
Figure 15:
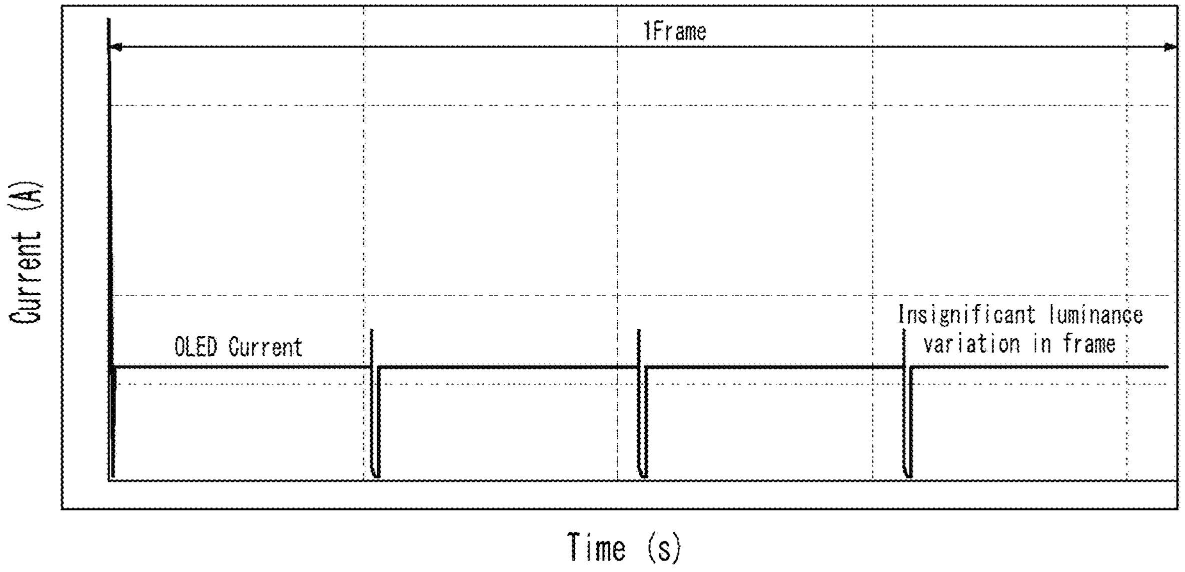
Figure 16:
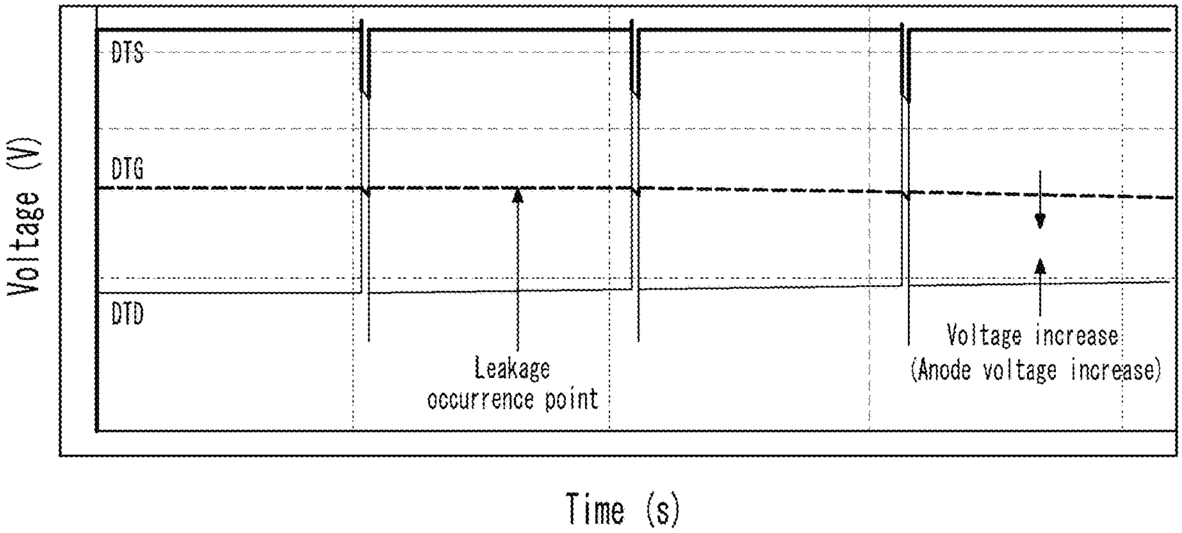
FIG. 16 and FIG. 17 show simulation results obtained from the subpixel of the experimental example of the present disclosure.
Figure 17:
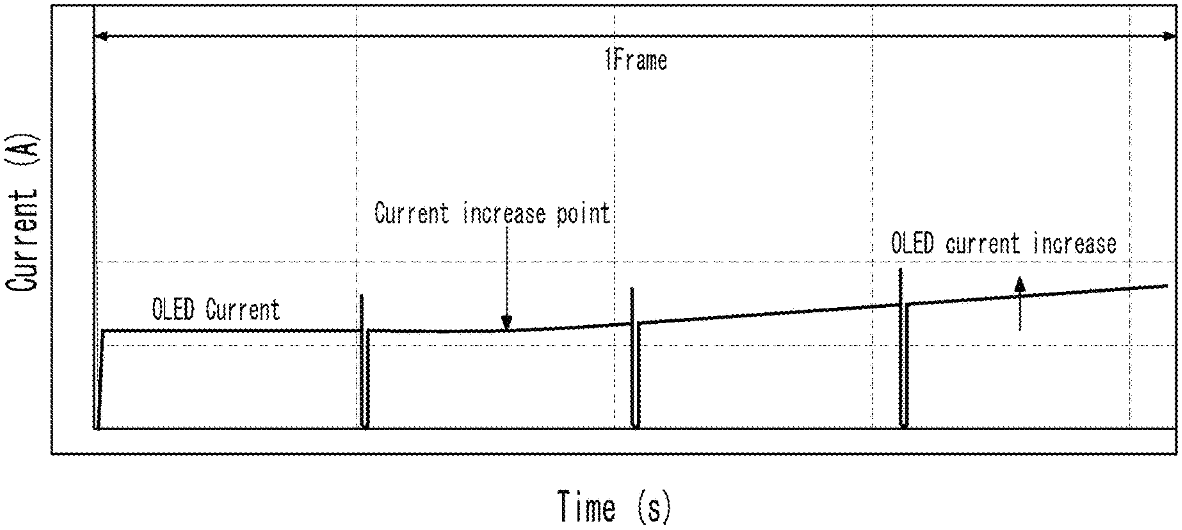

FIG. 14 and FIG. 15 show simulation results obtained from the subpixel of the second embodiment of the present disclosure, and FIG. 16 and FIG. 17 show simulation results obtained from the subpixel of the experimental example of the present disclosure.

As shown in FIG. 14, in the subpixel SP according to the second embodiment, the voltages of the gate node DTG, the source node DTS, and the drain node DTD of the driving transistor can slightly change within a frame. In addition, as shown in FIG. 15, in the subpixel SP according to the second embodiment, the luminance can slightly change within a frame due to stabilization of the current (OLED Current) flowing through the light-emitting diode.

As shown in FIG. 16, in the subpixel SP according to the experimental example, the voltage of the drain node DTD of the driving transistor can increase (the anode voltage can increase) after leakage occurs. In addition, as shown in FIG. 17, in the subpixel SP according to the experimental example, the current (OLED Current) flowing through the light-emitting diode can increase after the current increases.

In a subpixel implemented in a configuration similar or identical to that of the second embodiment of the present disclosure, voltage variation at the gate node DTG of the driving transistor can lead to luminance variation within a frame. In addition, luminance variation within a frame can be perceived as flicker, and such flicker can be aggravated during operation at a low frequency.

As can be ascertained from the simulation results of the second embodiment and the experimental example, when the subpixel SP is configured and driven as in the second embodiment, the leakage path from the first switching transistor SW1*a* and SW1*b* to the drain node DTD can be eliminated. In addition, voltage variation in the driving transistor can be reduced or minimized (blocked) and the current flowing through the light-emitting diode can be stabilized to reduce or minimize luminance variation. Further, the display quality can be improved by reducing or minimizing flicker during operation at a low frequency.

The simulation results of the second embodiment and the experimental example were obtained under the conditions of a high-level voltage of 4.6 V, a low-level voltage of −6.0 V, a first initialization voltage of −6.0 V, and a second initialization voltage of −6.5 V applied to the subpixel. However, these are values used as examples to prove the effects according to the second embodiment and are not limited thereto.

As described above, the present t disclosure has the effect of reducing or minimizing (blocking) voltage variation in the driving transistor by eliminating a current leakage path that can be caused by switching transistors located around the driving transistor. In addition, the present disclosure has the effect of reducing or minimizing luminance variation by stabilizing the current flowing through the light-emitting diode. Furthermore, the present disclosure can improve the display quality during operation at low frequencies by reducing or minimizing flicker.

It will be apparent to those skilled in the art that various modifications and variations can be made in the present disclosure without departing from the technical idea or scope of the present disclosure. Thus, it is intended that the present disclosure covers the modifications and variations of the present disclosure provided they come within the scope of the appended claims and their equivalents.

What is claimed is:

1. A display device comprising:

a display panel including a plurality of subpixels configured to display an image; and a driver configured to drive the display panel, wherein each of the plurality of subpixels comprises:

a light-emitting diode configured to emit light;

a driving transistor configured to generate a driving current to be supplied to the light-emitting diode;

a first switching transistor connected between a gate node and a drain node of the driving transistor, and including a first A switching transistor and a first B switching transistor configured to operate in response to an Nth scan signal applied through an Nth scan line, where N is a real number;

a second switching transistor connected between the gate node of the driving transistor and a first initialization voltage line, and configured to operate in response to an (N−1)th scan signal applied through an (N−1)th scan line;

a third switching transistor connected in series with the driving transistor such that the third switching transistor conducts the driving current supplied to the light-emitting diode; and a compensation transistor having a first electrode connected to a high-level voltage line and a second electrode connected to a connection point between the first A switching transistor and the first B switching transistor, and operating in response to an Nth control signal applied through an Nth control line, and wherein the compensation transistor and the third switching transistor both operate in response to the Nth control signal applied through an Nth control line.

2. The display device of claim 1, wherein the compensation transistor is turned on during an emission period in which the light-emitting diode emits light.

3. The display device of claim 1, wherein the compensation transistor is turned on during an emission period in which the light-emitting diode emits light so that a high-level voltage is applied to the connection point between the first A switching transistor and the first B switching transistor.

4. The display device of claim 1, wherein each of the plurality of subpixels comprises:

a first control transistor positioned between a source node of the driving transistor and the high-level voltage line; and a second control transistor positioned between the drain node of the driving transistor and an anode of the light-emitting diode.

5. The display device of claim 4, wherein the compensation transistor, the first control transistor, and the second control transistor are turned on simultaneously.

6. The display device of claim 1, wherein the transistors included in each of the plurality of subpixels are p-type low-temperature polycrystalline silicon (LTPS) transistors.

7. The display device of claim 1, wherein the first A switching transistor has a gate electrode connected to the Nth scan line, a first electrode connected to the gate node of the driving transistor, and a second electrode connected to a first electrode of the first B switching transistor, and wherein the first B switching transistor has a gate electrode connected to the Nth scan line, a first electrode connected to the second electrode of the first A switching transistor, and a second electrode connected to the drain node of the driving transistor.

8. The display device of claim 7, wherein each of the plurality of subpixels comprises:

a capacitor having a first electrode connected to the high-level voltage line and a second electrode connected to the gate node of the driving transistor;

a fourth switching transistor having a gate electrode connected to the Nth control line, a first electrode connected to the drain node of the driving transistor, and a second electrode connected to an anode of the light-emitting diode;

a fifth switching transistor having a gate electrode connected to the Nth scan line, a first electrode connected to a first data line, and a second electrode connected to the second electrode of the third switching transistor and a source node of the driving transistor; and a sixth switching transistor having a gate electrode connected to the Nth scan line, a first electrode connected to a second initialization voltage line, and a second electrode connected to the second electrode of the fourth switching transistor and the anode of the light-emitting diode, wherein the third switching transistor has a gate electrode connected to the Nth control line, a first electrode connected to the high-level voltage line, and a second electrode connected to the source node of the driving transistor.

9. The display device of claim 8, wherein the driving transistor includes a gate electrode connected to the second electrode of the capacitor, a first electrode connected to the second electrode of the fifth switching transistor and the second electrode of the third switching transistor, and a second electrode connected to a second electrode of the first B switching transistor and the first electrode of the fourth switching transistor, wherein the compensation transistor includes a gate electrode connected to the Nth control line, a first electrode connected to the high-level voltage line, and a second electrode connected to the connection point between the second electrode of the first A switching transistor and the first electrode of the first B switching transistor, and wherein the light-emitting diode includes the anode connected to the second electrode of the fourth switching transistor and the second electrode of the sixth switching transistor, and a cathode connected to a low-level voltage line.

10. A display device comprising:

a display panel including a plurality of subpixels configured to display an image, wherein one of the plurality of subpixels comprises:

a light-emitting element configured to emit light;

a driving transistor configured to generate a driving current to be supplied to the light-emitting element;

a first switching transistor connected between a gate node and a drain node of the driving transistor, and including a first A switching transistor and a first B switching transistor configured to operate in response to an Nth scan signal applied through an Nth scan line, where N is a real number;

a second switching transistor connected between the gate node of the driving transistor and a first initialization voltage line, and configured to operate in response to an (N−1)th scan signal applied through an (N−1)th scan line;

a third switching transistor connected in series with the driving transistor such that the third switching transistor conducts the driving current supplied to the light-emitting element; and a compensation transistor having a first electrode connected to a high-level voltage line and a second electrode connected to a connection point between the first A switching transistor and the first B switching transistor, and wherein the compensation transistor and the third switching transistor both operate in response to an Nth control signal applied through an Nth control line.

11. The display device of claim 10, wherein the compensation transistor is turned on during an emission period in which the light-emitting element emits light.

12. A method of driving a display device, the method comprising:

an initialization operation of initializing a gate node of a driving transistor based on a first initialization voltage;

a sensing and data write operation of initializing an anode of a light-emitting diode based on a second initialization voltage, sampling a threshold voltage of the driving transistor, and storing a data voltage applied through a first data line in a capacitor; and an emission operation of controlling the light-emitting diode to emit light based on a driving current generated from the driving transistor and blocking a leakage path between the gate node and a drain node of the driving transistor, wherein the driving current generated from the driving transistor passes through a third transistor in series with the driving transistor, and wherein the emission operation comprises applying a high-level voltage via a compensation transistor to a connection point between a first A switching transistor and a first B switching transistor connected between the gate node and the drain node of the driving transistor to block the leakage path, and wherein the compensation transistor and the third switching transistor both operate in response to an Nth control signal applied through an Nth control line.

13. The method of claim 12, wherein the applying the high-level voltage comprises turning on a compensation transistor having a first electrode connected to a high-level voltage line and a second electrode connected to the connection point between the first A switching transistor and the first B switching transistor and operating in response to an nth control signal applied through an Nth control line.

14. The method of claim 13, wherein the compensation transistor is turned on during an emission period in which the light-emitting diode emits light.

15. The display device of claim 1, wherein the third switching transistor includes a first node connected to the high-level voltage line, a second node connected to the driving transistor, and a gate node connected to a gate node of the compensation transistor.

16. The display device of claim 1, further comprising a fourth switching transistor connected in series with the driving transistor so that the third switching transistor and the fourth switching transistor conduct the driving current supplied to the light-emitting diode, wherein the compensation transistor, the third switching transistor, and fourth switching transistor operate in response to the Nth control signal applied through the Nth control line.

17. The display device of claim 16, wherein the third switching transistor includes a first node connected to the high-level voltage line, a second node connected to the driving transistor, and a gate node connected to a gate node of the compensation transistor.

18. The display device of claim 17, wherein the fourth switching transistor includes a first node connected to the driving transistor, a second node connected to the light-emitting diode, and a gate node connected to both the gate node of the compensation transistor and the gate node of the third switching transistor.

19. The display device of claim 16, wherein the fourth switching transistor includes a first node connected to the driving transistor, a second node connected to the light-emitting diode, and a gate node connected to both a gate node of the compensation transistor and a gate node of the third switching transistor.

20. The display device of claim 1, wherein the driving current passes from the high-level voltage line to the light-emitting diode through the third switching transistor.

* * * * *